UNITED STATES PATENT OFFICE.

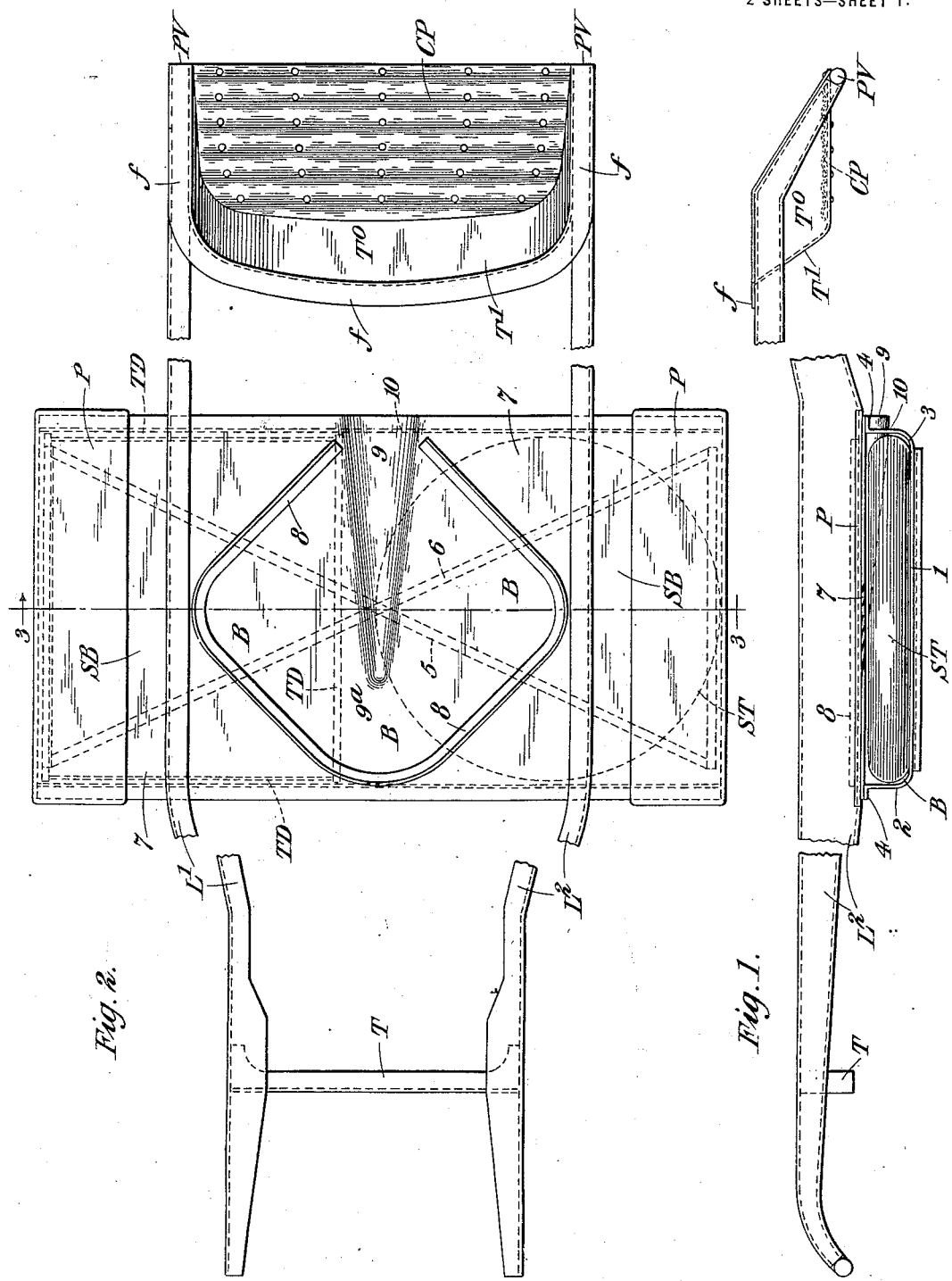

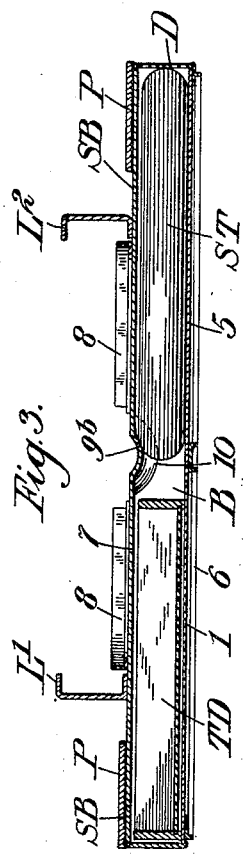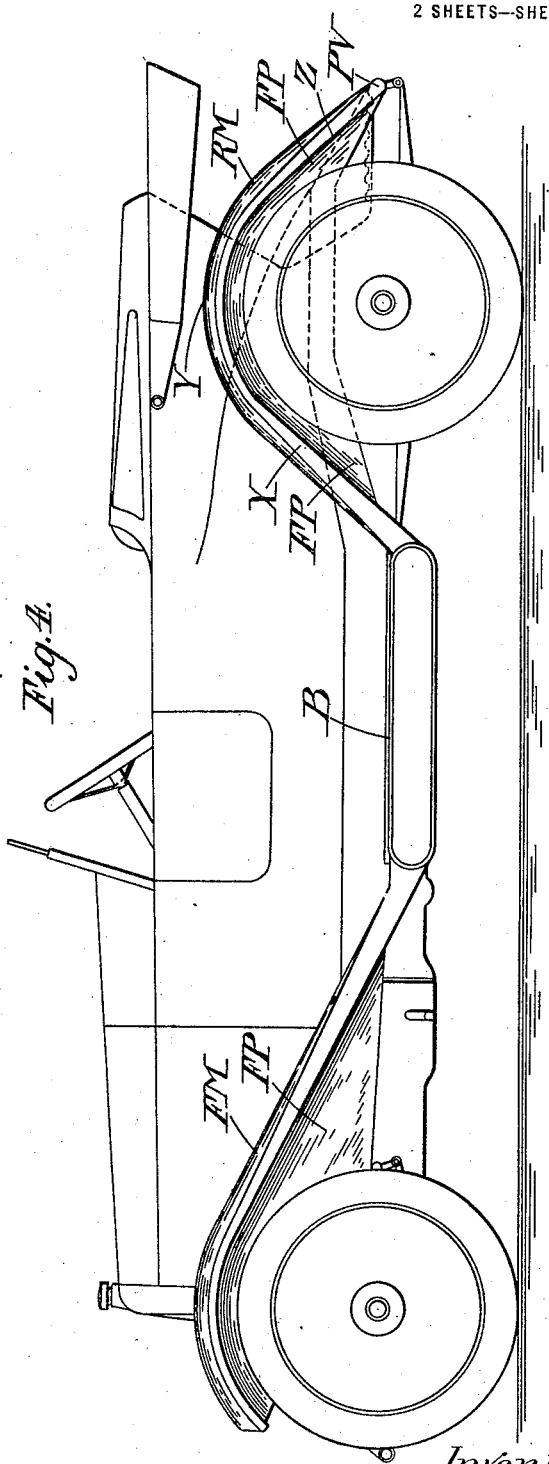

GEORGES ROESCH, OF LONDON, ENGLAND, ASSIGNOR OF ONE-HALF TO CLEMENT TALBOT, LIMITED, OF LONDON, ENGLAND.

CHASSIS-FRAME FOR AUTOMOBILES.

1,318,694.     Specification of Letters Patent.     Patented Oct. 14, 1919.

Application filed May 7, 1918. Serial No. 233,117.

*To all whom it may concern:*

Be it known that I, GEORGES ROESCH, a citizen of the Swiss Federation, residing in London, England, have invented certain new and useful Improvements in Chassis-Frames for Automobiles, of which the following is a specification.

The present invention relates to an improved chassis-frame for automobiles, the object of which is to provide cross-connections for the chassis longitudinals which shall not only efficiently stiffen the chassis but shall serve certain other useful purposes, as will hereinafter appear, thereby simplifying the construction of the car and reducing the number of supplemental fittings required in the use thereof.

The cross-connections for the chassis longitudinals according to the present invention comprise a flat tubular box midway between the ends of the chassis and projecting outwardly at its ends beyond the chassis longitudinals, and also a luggage-tray of the kind hereinafter described, between the after ends of the longitudinals.

In the accompanying drawings,

Figure 1 is a side elevation and

Fig. 2 a plan of a chassis having cross-connections between the longitudinals such as are above referred to and hereinafter described in detail;

Fig. 3 is a section on the line 3, 3, Fig. 2 of one of the cross-connections which is of box form; and Fig. 4 is a side elevation of a car provided with my improved construction.

Like reference letters indicate like parts throughout the drawings.

Referring to the drawings, according to the present invention there are combined with the two longitudinals $L^1$ $L^2$ of the chassis and a transverse tie such as T of any convenient form connecting them near their fore ends, a box B forming the middle cross-brace for the longitudinals and secured to the under side thereof. This box is wide and shallow and projects (see Fig. 2) beyond the longitudinals at each side of the car to form there a longitudinal step-board SB or step-support. The box is of light sheet metal and to distribute over the projecting ends of it any load which comes upon the step-portion, there may be laid upon the top of the latter a light stiff ribbed plate P of aluminium or any equivalent load-distributer plate to form a tread-plate.

A tray $T^\circ$ extends horizontally across between the after ends of the longitudinals $L^1$ $L^2$ with its bottom horizontal and strengthened by a layer of light corrugated plate CP or an equivalent stiffener laid on it and fixed to it, the length of the corrugations in the plate extending crosswise of the car. The rear edge of the tray terminates, preferably, opposite the standing pivot PV of the rear spring shackle at the extreme after end of the longitudinal. The fore end $T^1$ of the tray is inclined upwardly from the bottom, and the sides and front margin of the tray are flanged as at $f$ to engage with the aforesaid longitudinals and to support part of the car body, at the after end of which the longitudinals and the tray project, so as to provide a support for luggage.

One end of the box cross-brace B above referred to may be provided with a tool-drawer TD (Fig. 3) inserted into it and the other end is adapted to receive a spare tire ST.

The construction of the box is preferably as follows:—

The bottom is a flat light sheet 1 bent up through ninety degrees at its forward and after ends 2 and 3 and flanged outwardly at 4 along the margin of these upturned ends. It is strengthened by angle-iron stiffeners such as 5, 6 preferably arranged in an X form and riveted on to the bottom, or the box may be stamped with convenient corrugations. The top is a flat plate 7 secured upon the portions flanged outwardly as aforesaid. This may also be strengthened by an approximately square loop 8 of angle-iron laid on and riveted to it or also be made with corrugations.

The said top is dished with a longitudinal inclined channel 9 and the adjacent after end of the box is correspondingly notched at 10. The shape of the dishing and of the notch is such that on the top of the box the said channel or groove commences at $9^a$ near its forward edge and proceeds aft, gradually becoming wider and deeper as it approaches the notch in the afterside of the box. The groove is shaped thus in order to afford a suitable clearance space along which the usual connection (not shown in the drawing) between the gear-box and the rear axle may extend over the top of the box with the necessary freedom for vertical movement in relation thereto.

The depression (see 9ᵇ Fig. 3) which will be found on the inside of the box as a result of the provision of the groove upon the outside of the top affords a convenient abutment against which the tire ST may be lightly jammed and held by the closing of the door D of the corresponding end of the box or otherwise ligthly pressed into place so that the tire will be lightly held fixed in position in its receptacle, and will not move about therein or rattle.

In Fig. 4 I have illustrated the manner in which the horizontal foot-board B may be readily combined with a front mudguard FM rising from its forward end, and a rear mudguard RM having a straight portion X, a circular portion Y and a downwardly extending portion Z terminating opposite to the stationary pivot PV on the chassis of the after shackle of the rear spring.

What I claim as my invention and desire to secure by Letters Patent is:—

1. In an automobile chassis-frame, the combination with two longitudinal members, and a transverse tie connecting the same near their fore ends, of a flat tubular box constituting a middle cross-brace which is secured directly to the underside of the middle portions of the longitudinal members and projects laterally beyond the latter at each side thereof to form step-boards, for the purpose specified, substantially as described.

2. In an automobile chassis-frame, the combination with two longitudinal members, and a transverse tie connecting the same near their fore ends, of a flat tubular box having forward and after outwardly-flanged ends integral with its bottom, and a flat plate constituting the top of the box secured upon the flanges of the said ends, said box constituting a middle cross-brace which is secured directly to the underside of the middle portions of the longitudinal members and projects laterally beyond the latter at each side thereof to form step-boards, substantially as described.

3. In an automobile chassis-frame, the combination with two longitudinal members, and a transverse tie connecting the same near their fore ends, of a flat tubular box constituting a middle cross-brace which is secured directly to the underside of the middle portions of the longitudinal members and projects laterally beyond the latter at each side thereof to form step-boards, the top of the box being provided with a channel situated in the central vertical longitudinal plane between the two longitudinal members, which channel is narrower at its forward end and becomes wider and deeper toward its rear end adapted to receive a part of the operating mechanism of the automobile and form a partial division of said tubular box, for the purpose specified, substantially as described.

4. In an automobile chassis-frame, the combination with two longitudinal members, and a transverse tie connecting the same near their fore ends, of a flat tubular box constituting a middle cross-brace which is secured directly to the underside of the middle portions of the longitudinal members and projects laterally beyond the latter at each side thereof to form step-boards, and a sheet-metal luggage-tray having a horizontal bottom constituting a rear cross-connection which is secured directly to the after ends of the said longitudinal members, for the purpose specified, substantially as described.

5. In an automobile chassis-frame, the combination with two longitudinal members, and a transverse tie connecting the same near their fore ends, of a flat tubular box constituting a middle cross-brace which is secured directly to the underside of the middle portions of the longitudinal members and projects laterally beyond the latter at each side thereof to form step-boards, a sheet-metal luggage-tray having a horizontal bottom constituting a rear cross-connection which is secured directly to the after ends of the said longitudinal members, and a plate having corrugations directed transversely relatively to the longitudinal members secured on the bottom of the luggage-tray, for the purpose specified, substantially as described.

6. In an antomobile chassis-frame, the combination with two longitudinal members, and a transverse tie connecting the same near their fore ends, of a flat tubular box constituting a middle cross-brace which is secured directly to the underside of the middle portions of the longitudinal members and projects laterally beyond the latter at each side thereof to form step-boards, and a sheet-metal luggage-tray having a horizontal bottom constituting a rear cross-connection, the fore end of the tray slanting upward from the bottom, and the sides and front margin of the tray being flanged and secured by the flange to the after ends of the said longitudinal members, for the purpose specified, substantially as described.

In testimony whereof I affix my signature.

GEORGES ROESCH.